UNITED STATES PATENT OFFICE.

EMIL SCHEITLIN, OF BASEL, AND ERICH KUNZ, OF GENEVA, SWITZERLAND, ASSIGNORS TO LEON GIVAUDAN, OF GENEVA, SWITZERLAND, AND EMIL SCHEITLIN, OF BASEL, SWITZERLAND.

PROCESS OF MANUFACTURING NEW PHARMACEUTICAL PREPARATIONS.

1,068,083. Specification of Letters Patent. Patented July 22, 1913.

No Drawing. Application filed March 29, 1912. Serial No. 687,170.

*To all whom it may concern:*

Be it known that we, EMIL SCHEITLIN, a citizen of the Swiss Confederation, and residing at Basel, Switzerland, and ERICH KUNZ, a citizen of the Swiss Confederation, and residing at Geneva, Switzerland, have invented a certain new and useful Improved Process of Manufacturing New Pharmaceutical Preparations, of which the following is a specification.

Our invention relates to a process of manufacturing new pharmaceutical preparations.

The actions of 1-phenyl-2.3-dimethyl-5-pyrazolone, of 1-phenyl-2.3-dimethyl-4-dimethylamino-5-pyrazolone and of acetyl-p-phenetidin on the living organism are well-known and the results of the investigations relating thereto are described in scientific journals. Now we have found that when all the said three bodies are employed together either as a simple mixture or a crystallized product of two or more, or mixtures of crystallized products the beneficial properties of each individually are combined, while the undesirable actions of the individual bodies disappear owing to the small dose of the individual components. This exceedingly valuable result could not be foreseen; on the contrary, the supposition was that the pharmaco-dynamically strongest or most rapidly operative component for example, the 1-phenyl-2.3-dimethyl-5-pyrazolone, would not allow the other bodies to act at all. Considerable disadvantages are however connected with the employment of the three bodies in their simplest form, *i. e.* mixed together. The mixture is not very stable. Without being exactly hygroscopic it has a tendency to deliquesce in air which is not dry or when great changes in temperature occur. Further, it is possible for the mixture to separate into its component parts. We have found also that these defects can be largely obviated by melting the three bodies together, whereupon they congeal in a crystalline form, or when they are crystallized together. If preferred, however, double compounds may be made of each two of the components, and the double compounds thus obtained mixed or crystallized.

Example 1: 2 molecules of 1-phenyl-2.3-dimethyl-5-pyrazolone and 1 molecule of acetyl-p-phenetidin are dissolved in hot toluol; when cold, uniform crystals of the double compound having a melting point at 80° C. are obtained.

Example 2: 2 molecules of 1-phenyl-2.3-dimethyl-4-dimethylamino-5-pyrazolone and 1 molecule of acetyl-p-phenetidin are treated as in Example 1. The melting point of the crystals is about 80° C.

Example 3: Equal parts by weight of the bodies obtained according to Examples 1 and 2 are mixed together or molecularly crystallized together. The product melts at 80° C.

We claim:—

1. A new article, comprising 1-phenyl-2.3-dimethyl-5-pyrazolone and acetyl-p-phenetidin crystallized together.

2. As a new article of manufacture, a body composed of 1-phenyl-2.3-dimethyl-5-pyrazolone, 1-phenyl-2.3-dimethyl-4-dimethylamino-5-pyrazolone and acetyl-p-phenetidin.

3. A new article, comprising crystals containing 1-phenyl-2.3-dimethyl-5-pyrazolone; 1-phenyl-2.3-dimethyl-4-dimethylamino-5-pyrazolone and acetyl-p-phenetidin.

In testimony whereof, we affix our signatures in the presence of two witnesses.

EMIL SCHEITLIN.
ERICH KUNZ.

Witnesses:
LOUIS H. MUNIER,
F. VILLIER.